(12) United States Patent
Fancsali et al.

(10) Patent No.: US 11,270,138 B2
(45) Date of Patent: Mar. 8, 2022

(54) VCSEL BASED BIOMETRIC IDENTIFICATION DEVICE

(71) Applicant: Lumileds LLC, San Jose, CA (US)

(72) Inventors: Erno Fancsali, Aachen (DE); Rob Engelen, Aachen (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/758,281

(22) PCT Filed: Oct. 17, 2018

(86) PCT No.: PCT/EP2018/078371
§ 371 (c)(1),
(2) Date: Apr. 22, 2020

(87) PCT Pub. No.: WO2019/081293
PCT Pub. Date: May 2, 2019

(65) Prior Publication Data
US 2020/0342244 A1    Oct. 29, 2020

(30) Foreign Application Priority Data

Oct. 23, 2017   (EP) ..................................... 17197702

(51) Int. Cl.
*G06K 9/00*    (2006.01)
*G06K 9/20*    (2006.01)

(52) U.S. Cl.
CPC ......... *G06K 9/00885* (2013.01); *G06K 9/209* (2013.01); *G06K 9/2027* (2013.01)

(58) Field of Classification Search
None
See application file for complete search history.

(56) References Cited

U.S. PATENT DOCUMENTS

2006/0180886 A1*   8/2006   Tsang ................ H01L 31/02162
                                                              257/432
2010/0259506 A1*  10/2010   Ko ........................ G06F 3/0428
                                                              345/175
(Continued)

FOREIGN PATENT DOCUMENTS

WO       2015123440 A1     8/2015
WO    WO 2015/123440    *  8/2015

OTHER PUBLICATIONS

"Vertical-Cavity Surface-Emitting Laser Technology", Princeton Optronics, 1-18.
(Continued)

*Primary Examiner* — Edward Park
(74) *Attorney, Agent, or Firm* — Servilla Whitney LLC (57) ABSTRACT

The invention describes a device (1) and a method (100) for bio metric identification of an object with a significantly improved signal-to-noise ratio. The device comprises an optical image sensor element (11) at least sensitive to an infrared spectrum to take at least one picture (112) of the object (2) under ambient light conditions (ALC) with additional infrared light conditions (ILC), an infrared light source (12) to provide additional infrared light (IR) for the infrared light conditions (ILC), and a processing unit (13) to provide an image or image code (131) for the bio metric identification obtained from the picture (112), where the infrared light source (12) emits a narrow infrared light spectrum with a peak wavelength (121) between 925 nm to 955 nm and with a full width of half maximum of less than 5 nm, and where an infrared bandpass filter (14) is arranged in the light path (LP) between the object (2) and a sensor array of the optical image sensor element (11) having a transmission window (141) between 925 nm and 955 nm (Continued)

covering at least the peak wavelength (121) of the infrared light source (12).

15 Claims, 5 Drawing Sheets

(56) References Cited

U.S. PATENT DOCUMENTS

| | | | |
|---|---|---|---|
| 2016/0193365 A1* | 7/2016 | de Haas | A61K 49/003 |
| | | | 600/431 |
| 2017/0161557 A9 | 6/2017 | Saylor et al. | |
| 2020/0342244 A1* | 10/2020 | Fancsali | G06K 9/00013 |
| 2021/0042547 A1* | 2/2021 | Engelen | G06K 9/00906 |

OTHER PUBLICATIONS

Hardy, Eleonore , "Spectral Measurements of VCSEL for NIR Illumination", http://mylaserspectrum.com/author/e-hardy/, Nov. 16, 2015, 1-3.

Khan, Naizul Islam, et al., "A Comparative Study of the Temperature Dependence of Lasing Wavelength of Conventional Edge Emitting Stripe Laser and Vertical Cavity Surface Emitting Laser", 1-6.

* cited by examiner

VCSEL BASED BIOMETRIC IDENTIFICATION DEVICE

CROSS-REFERENCE TO RELATED APPLICATIONS

This application is the National Stage entry of PCT/EP2018/078371, filed on Oct. 17, 2018, which claims priority to U.S. Provisional application Ser. No. 17/197,702.8, filed Oct. 23, 2017, the entire disclosures of which are hereby incorporated by reference herein.

FIELD OF THE INVENTION

The invention relates to a device for biometric identification of an object with a significantly improved signal-to-noise ratio and to method for biometric identification using such a device.

BACKGROUND OF THE INVENTION

Face recognition, iris scanning and driver monitoring systems are automated methods of biometric identification that uses mathematical pattern-recognition techniques on video images of the face, whose complex patterns are unique, stable, and can be seen from some distance.

Common biometric identification systems such as face recognition, iris scanning and driver monitoring systems use video camera technology with subtle near infrared LED illumination to acquire images of the detail-rich, and shadow free. Digital templates encoded from these patterns by mathematical and statistical algorithms allow the identification of an individual or detecting driver state.

Biometric identification needs to work in all kind of ambient conditions. In outdoor conditions, the sun produces a significant amount of infrared (IR) illumination on the object. Commonly an active IR illuminator synchronized with a camera is placed in front of the object. Taking pictures of an object with and without IR illumination and subsequent subtracting generates shadow free images of the object. The camera system used for face recognition, iris scanning and driver monitoring systems receives both active IR and solar illumination. Every second picture (frame) is only illuminated with active IR illumination. The pictures (frames) with and without active IR illumination can be subtracted from each other to generate a shadow free image with lower noise on the subtracted IR image. To improve the signal to noise ratio IR bandpass filters are used. The peak wave length of IR-LED varies about 36 nm as function of environment temperature (−40 to 85 C). An IR bandpass filter can be used to filter out spectral content of solar illumination outside of the spectral range of the IR-LED in order to increase signal to noise ratio at the camera sensors. However, the width of the bandpass filter taking into account possible thermal shifts of the peak wavelength of the IR-LED is too wide to provide a demanded low signal to noise ration of the IR image.

Therefore, a system is required enabling a significant improvement of the signal to noise ration for images taken by cameras for biometric identification.

SUMMARY OF THE INVENTION

It is an object of the present invention to provide a system providing a significantly improved signal-to-noise ratio in outdoor conditions for images taken by cameras for biometric identification.

The invention is defined by the independent claims. The dependent claims define advantageous embodiments.

According to a first aspect a device for biometric identification of an object comprising an optical image sensor element at least sensitive to an infrared spectrum to take at least one picture of the object under ambient light conditions with additional infrared light conditions, an infrared light source to provide additional infrared light for the infrared light conditions, and a processing unit to provide an image or image code for the biometric identification obtained from the picture, where the infrared light source emits a narrow infrared light spectrum with a peak wavelength between 925 nm to 955 nm and with a full width of half maximum of less than 5 nm, and where an infrared bandpass filter is arranged in the light path between the object and a sensor array of the optical image sensor element having a transmission window between 925 nm and 955 nm covering at least the peak wavelength of the infrared light source.

The term "infrared light source" denotes any suitable solid-state light emitters emitting light within a narrow emission band of a 5 nm or less. Such suitable emitters might be edge emitting lasers or so-called VCSELs. The ratio of the illumination created by active IR and the sun is critical to generate as low as possible noise on the subtracted IR image. Due to the infrared absorption in the solar spectrum due to the presence of water in the atmosphere, there is a wavelength range between 925 nm and 955 nm in the solar spectrum with low infrared intensity, the water absorption deep. In order to increase the signal-to-noise ratio of the image the peak wavelength of the infrared light source shall be located within the wavelength range of 925 nm to 955 nm. Furthermore the transmission window of the bandpass filter is adapted to the peak wavelength of the infrared light source and the water absorption deep range. The other wavelengths, especially the content of infrared light coming from ambient light (solar spectrum) are filtered out in order to further increase the signal-to-noise ratio. The lower the infrared content within the ambient light and the higher the infrared light level coming from the infrared light source, the higher is the signal-to-noise ratio for the obtained image. The image might be obtained from the taken pictures after one or more additional image processing steps. The high signal-to-noise ratio is achieved by choosing an optimized peak wavelength within the range of water absorption deep combined with using an infrared bandpass filter with narrow transmission window around the peak wavelength of the infrared light source lying inside the water absorption deep.

The term "optical image sensor element" denotes the unit, which receives light from the object and transfers the locally measured intensity of the light into a picture of the object. The optical image sensor element comprises a suitable sensor array for measuring the light intensity with a special resolution determined by the sensor array. The optical image sensor element may comprise optical beam shaping elements such as lenses, mirrors etc. The bandpass filter might be arranged remote or on top of the optical image sensor element or at a suitable position within the optical image sensor element.

To provide an image code from a picture or from an image an algorithm processes the image and collects the features, which are stored as a reference images codes. For iris scanning an iris code as the image code is generated after several mathematic steps functions applied to the obtained image to be compared with a corresponding reference image code obtained from the reference image.

Therefore, the device according to the present invention provides a significantly improved signal to noise ratio in outdoor conditions for images taken for biometric identification leading to a more secure and reliable identification of objects based on biometric features.

In an embodiment the peak wavelength of the light source in the device according to the present invention has a wavelength shift of less than ±9 nm around the peak wavelength at room temperature with a temperature range between −40° C. and +80° C. Infrared light sources providing the specified narrow emission spectra enabling to keep the full spectrum within the specified wavelength range between 925 nm and 955 nm even in case of thermally caused peak wavelength shifts enabling a large temperature operation window for the device according to the present invention.

In an embodiment the peak wavelength of the infrared light source is between 930 nm and 950 nm at room temperature. The wavelength of 940 nm is in the middle of the range of the ambient light spectrum, where the water absorption is large resulting in a particular low infrared content in the ambient light. For higher temperatures the peak wavelengths shift to longer wavelengths, for deeper temperatures the shift is to shorter wavelengths. An optimum infrared peak wavelength of the infrared light source is approximately 940 nm due to water absorption deep. The term approximately denotes a range around the specified peak wavelength of ±2 nm.

In an embodiment an emission spectrum of the infrared light source has a full width of half maximum of less than 1 nm. For such narrow spectra the transmission window can be designed more narrow for a desired range of operation temperatures without loosing intensity of the infrared light of the infrared light source even for high or low operation temperatures. The peak wavelength of the infrared light emitted from the infrared light source will shift with temperature. Within the range of operation temperatures, the complete infrared light source emission spectrum should be within the transmission window in order to provide maximized intensity of the infrared light reaching the optical sensor element through the transmission filter.

In an embodiment the infrared light source is a VCSEL. The term "VCSEL" denotes a vertical-cavity surface-emitting laser, where the laser beam is emitted perpendicular from the top surface of the VCSEL contrary to conventional edge-emitting semiconductor lasers. VCSELs emit light within a very narrow emission band of a few nm or less, for instance less than 1 nm. There is a large variety of VCSELs providing laser beams with peak wavelengths ranging from 650 to 2000 nm. The signal-to-noise ratio can be further improved by choosing an optimized peak wavelength within the range of water absorption deep combined with using an infrared bandpass filter with narrow transmission window around the peak wavelength of the VCSEL lying inside the water absorption deep. A VCSEL according to the present invention may have a size of a lead frame or ceramic package for instance of 2.0*1.6*1.1 mm to 5.0*5.0*2. mm. The VCSEL die is assembled in the package. In case of a present diffusor plate to shape the emitted infrared light beam this plate is glued to the top of the package. In an embodiment the VCSEL is operated with a current above a current threshold of the current lever. The current lever influences the full width of half maximum of the emission spectrum of the VCSEL, where the full width of half maximum increases significantly in case of operating the VCSEL at a current below the current threshold.

In an embodiment the transmission window of the bandpass filter has a width of less than 30 nm, preferably less than 15 nm. The center of a transmission window of such bandpass filters can be matched with the minimum infrared intensity of the solar (ambient) spectrum where the narrow transmission window only covers the wavelength in the direct neighborhood of the minimum intensity of the solar spectrum reducing the amount of solar infrared light and therefore reducing the noise in the obtained image for biometric identification. Furthermore the narrow infrared emission spectrum of the infrared light source enables to use bandpass filters providing such narrow transmission windows allowing keeping the peak wavelength of the infrared light source within the narrow transmission window for all demanded operation temperatures.

In an embodiment the infrared bandpass filter is adapted to pass less than 2% of the entire ambient light. When adapting the transmission window to the range of the solar (ambient) spectrum where the infrared intensity is very low, the amount of solar (ambient) light passing the bandpass filter is significantly reduced. The required adaption of the transmission window is enabled e.g. by the use of VCSELs as infrared light sources.

In an embodiment the device further comprises a diffuser unit arranged within the light path between the infrared light source and the object providing a light beam with a beam angle between 20° and 100° towards the object. The diffusor plate shapes the emitted infrared light beam in order to be able to illuminate uniformly at least the areas of interest of the object even for small distances between infrared light source and object. In case of infrared light sources providing laser beams, the diffusor plate widens the original light beam. In case of other infrared light sources, the diffusor plate might narrow the original light beam. Depending on the present infrared light source skilled people are able to use diffusor plates providing the required beam shaping properties.

In another embodiment the diffuser unit is arranged on top of the infrared light source to provide a compact device enabling to located the infrared light source close to the object in order to enhance the intensity of the infrared light by fully illuminating the areas of interest of object while not wasting infrared light illuminating areas of the object not being used for biometric identification. The diffusor plate might be glued on top of the infrared light source.

In another embodiment the device comprises or is at least connected to an image database storing reference images or reference image codes in order to perform the biometric identification by comparing the obtained image or image code with the reference images or reference image codes. For the biometric identification an access to reference images or reference image codes allowing proving agreement between obtained image or image code and reference image or reference image code is mandatory. The device may comprise a storage unit acting as an image database enabling fast and easy access to the reference images or reference image codes. In another embodiment the device might be connected via a data connection, e.g. a wireless data connection, to a remote image database, e.g via the internet or via a cellular phone network enabling to update the reference image database remotely from the device.

In an embodiment the device is adapted to take at least two separate pictures of the object under ambient light conditions with and without infrared light conditions, where the processing unit provides the image or image code from subtracting the picture under ambient light conditions from the picture under additional infrared light conditions. The subtracting step eliminates the infrared light contribution from ambient light which significantly further decreases the noise level while maintaining the high signal level obtained by the narrow peaked infrared light from the infrared light source of the device resulting in a very high signal-to-noise ratio for the image obtained after subtracting step.

In an embodiment the device is a mobile phone, a tablet computer, a driver monitoring unit for automotive applications or an access checking component of a locking unit. The identification techniques used by the device might be iris scanning and/or face recognition.

According to a first aspect a method for biometric identification of an object with a device according to the present invention comprising an optical image sensor element at least sensitive to an infrared spectrum, an infrared light source to provide infrared light for additional infrared light conditions, an infrared bandpass filter being arranged in the light path between the object and a sensor array of the optical image sensor element, and a processing unit is provided. The method comprises the steps of:

taking at least one picture of the object under ambient light conditions with additional infrared light conditions, where the infrared light source emits infrared light with a peak wavelength between 925 nm to 955 nm, and the infrared bandpass filter has a transmission window between 925 nm and 955 nm covering the peak wavelength of the infrared light source, obtaining an image or image code for the biometric identification from the picture by the processing unit, and executing the biometric identification by comparing the obtained image or image code with reference images or reference image codes from an image database.

The method according to the present invention enables to provide images with a significantly improved signal to noise ratio taken for biometric identification leading to a more secure and reliable identification of objects based on biometric features.

In an embodiment of the method
the taking step comprises taking at least two separate pictures of the object under ambient light conditions with and without and infrared light conditions, and the obtaining step comprises subtracting the picture under ambient light conditions from the picture under additional infrared light conditions by the processing unit to obtain the image or image code for the biometric identification.

In an embodiment of the method the VCSEL has a peak wavelength between 930 nm and 950 nm at room temperature, preferably approximately at 940 nm at room temperature.

In an embodiment of the method the infrared bandpass filter is adapted to pass less than 2% of the ambient light.

In an embodiment of the method a diffuser unit is arranged within the light path between the VCSEL and the object providing a light beam with a beam angle between 20° and 100° towards the object.

It shall be understood that a preferred embodiment of the invention can also be any combination of the dependent claims with the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings.

In the Figures, like numbers refer to like objects throughout. Objects in the Figs. are not necessarily drawn to scale.

DETAILED DESCRIPTION OF EMBODIMENTS

Various embodiments of the invention will now be described by means of the Figures.

Figure 1:
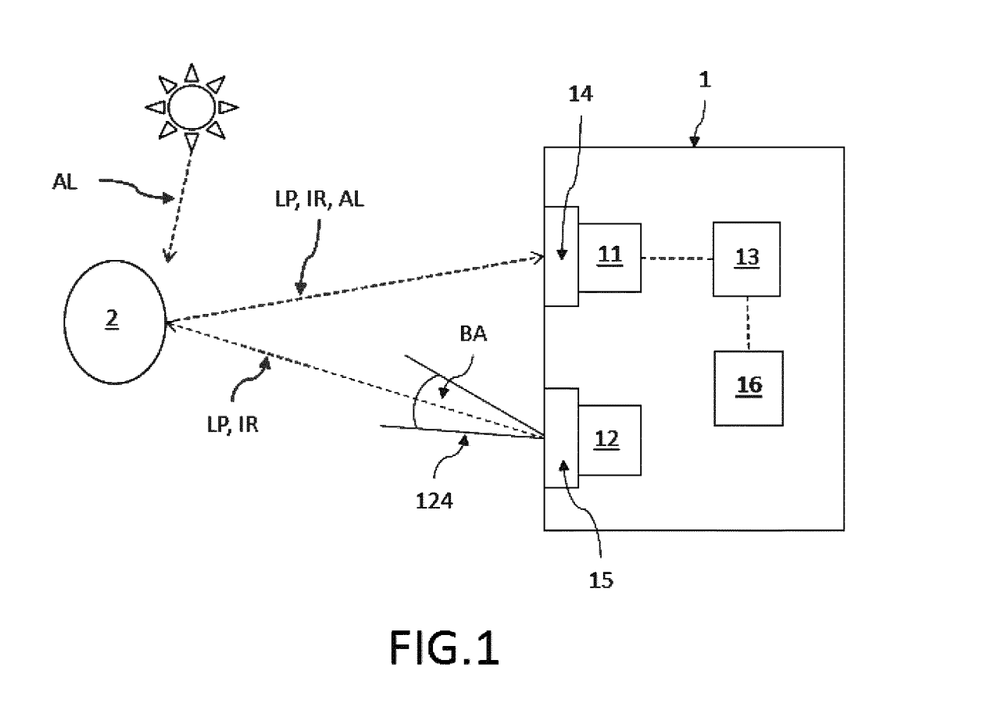
FIG. 1 shows a principle sketch of an embodiment of the device according to the present invention.

FIG. 1 shows a principle sketch of an embodiment of the device 1 for biometric identification of an object 2 according to the present invention. In this embodiment the device 1 comprises an optical image sensor element 11 at least sensitive to an infrared spectrum to take at least two separate pictures 111, 112 of the object 2 under ambient light conditions ALC (sun provides solar light AL) with and without infrared light conditions ILC (an infrared light source provides additional infrared light IR). The device 1 further comprises an infrared light source 12 to provide additional infrared light IR for the infrared light conditions ILC. The device 1 further comprises a processing unit 13 to provide an image 131 or image code for the biometric identification obtained from subtracting the picture 111 under ambient light conditions ALC from the picture 112 under additional infrared light conditions ILC. Suitable software to subtract picture data from each other to provide a resulting image are known to people skilled in the art. In this embodiment the infrared light source 12 is a VCSEL emitting infrared light with a peak wavelength 121 between 925 nm to 955 nm. Here the infrared bandpass filter 14 is arranged in the light path LP between the object 2 and the optical image sensor element 11 on top of the optical image sensor element 11 having a transmission window 141 between 925 nm and 955 nm covering the peak wavelength 121 of the VCSEL. Commonly the field of view (FOV) of the camera (optical image sensor element 11) is a few degrees smaller than the field of view of the illuminator (infrared light source 12). The device 1 further comprises a diffuser unit 15 arranged within the light path LP between the VCSEL 12 and the object 2 on top of the VCSEL providing a light beam 124 with a beam angle BA between 20° and 100° towards the object 2. The device 1 further comprises an image database 16 storing reference images or reference image codes 161 in order to perform the biometric identification by comparing the obtained image or image codes 131 with the reference images or reference image codes 161. The device 1 might be a mobile phone, a tablet computer, a desk top computer, a driver monitoring unit for automotive applications or an access checking component of a locking unit. The identification techniques used by the device might be iris scanning and/or face recognition.

Figure 2:
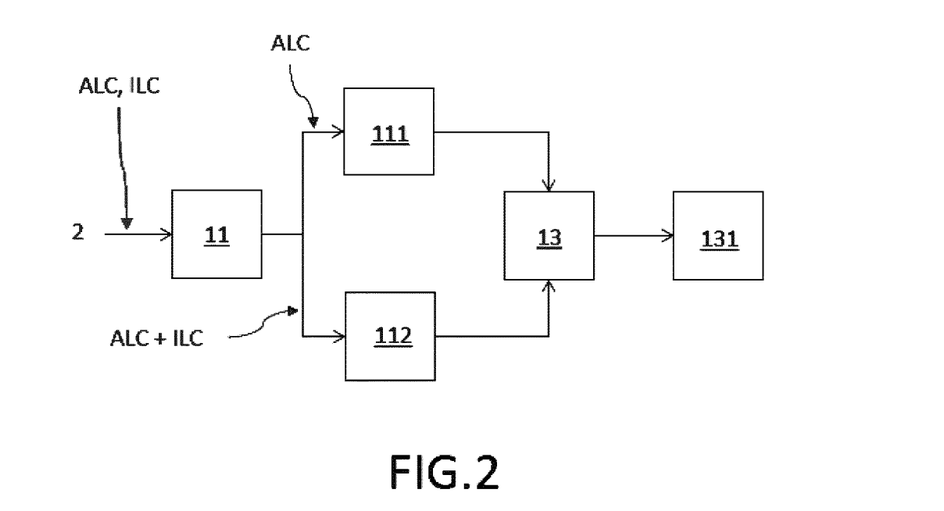
FIG. 2 shows a principle sketch of taking the separate pictures and subtracting the pictures from each other with the device of FIG. 1.

FIG. 2 shows a principle sketch of taking the separate pictures 111, 112 and subtracting the pictures from each other with the device 1 of FIG. 1. The pictures 111, 112 were taken by the optical image sensor element 11 under ambient light conditions ALC with and without and infrared light conditions ILC provided by the infrared light source emitting infrared light IR with a peak wavelength 121 between 925 nm to 955 nm. The image or image codes 131 used for subsequent biometric identification is obtained from subtracting the picture 111 under ambient light conditions ALC from the picture 112 under additional infrared light conditions ALC+ILC by the processing unit 13, where a suitable image processing software is installed and executed. Suitable software to subtract picture data from each other to provide a resulting image is known to people skilled in the art.

Figure 3:
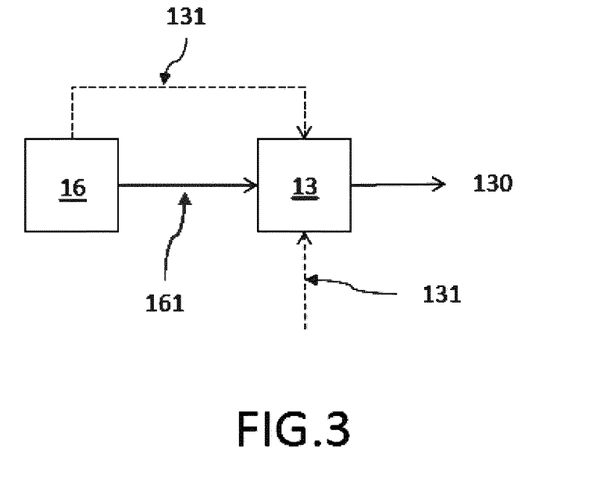
FIG. 3 shows a principle sketch of comparing the obtained image with reference images in order to identify the object based on biometric parameters.

FIG. 3 shows a principle sketch of comparing the obtained image or image code 131 with reference images or reference image codes 161 in order to identify 130 the object 2 based on biometric parameters. Here the identification might be executed by the processor 13 where a suitable software to compare two different images is installed and executed. Suitable software to compared images is known to people skilled in the art. The software may provide a matching probability for the comparison where a positive matching is acknowledged for a matching probability above a predetermined threshold. In other embodiments not the actual images might be stored but a processed feature code which shall be compared to a corresponding reference image code obtained from a reference image.

Figure 4:
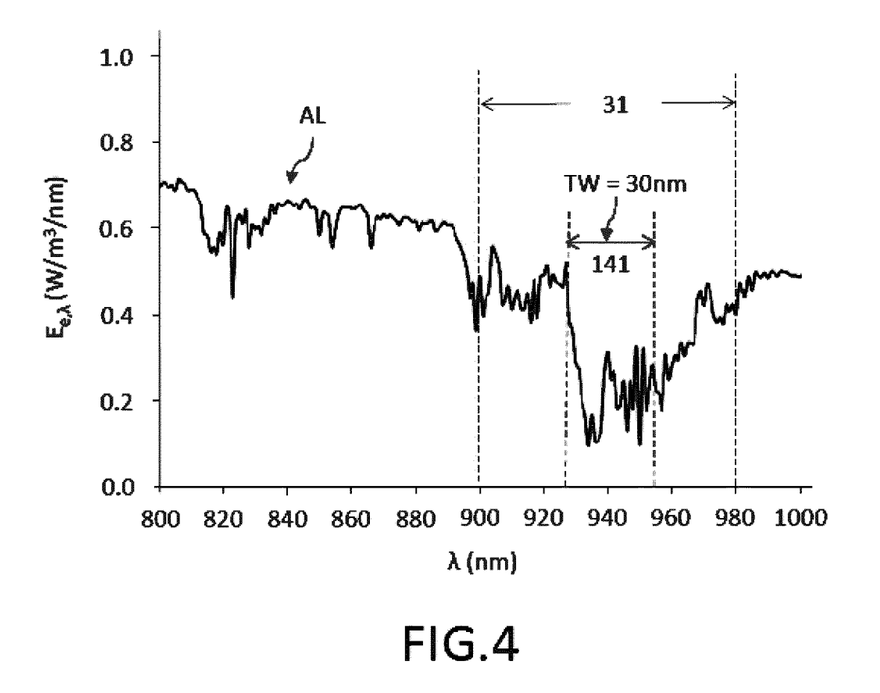
FIG. 4 shows the infrared solar spectra (ambient light) and the water deep between 925 nm and 955 nm.

FIG. 4 shows the irradiance of an object at 90 cm distance and 0° referenced to the normal vector to the surface of the emitter in $W/m^3/nm$ for the solar spectrum AL (ambient light) reflected from the object from a distance of 90 cm as a function of wavelengths from 800 nm to 1000 nm and the water deep between 925 nm and 955 nm. The water deep denotes a part of the solar spectrum AL, where the infrared intensity is particular low, much lower compared to the neighbored wavelength ranges. The device 1 comprises a bandpass filter 14 with a transmission window 141 extending from 925 nm to 955 nm having a width TW of 30 nm or even less, e.g. 20 nm extending from 930 nm to 950 nm. The required transmission window 131 for infrared LEDS is also shown to demonstrate the advantage in case of using VCSELs as infrared light sources 12. In case of using infrared LEDS, the transmission window is much broader in order to receive sufficient infrared light from the infrared LED light source resulting in a much higher noise level due to the wavelength characteristic of infrared portion the solar light. In case of using VCSELs the transmission window 141 can be chosen more narrow (TW=30 nm instead of 80 nm for LEDs) in order to reduce the received amount of infrared solar light AL. The resulting bandpass filter 14 according to the present invention might be adapted to pass less than 2% of the entire ambient light AL by choosing the center wavelength of the transmission window around 940 nm and sufficiently narrowing the transmission window, e.g. to a width of 10 nm.

Figure 5:
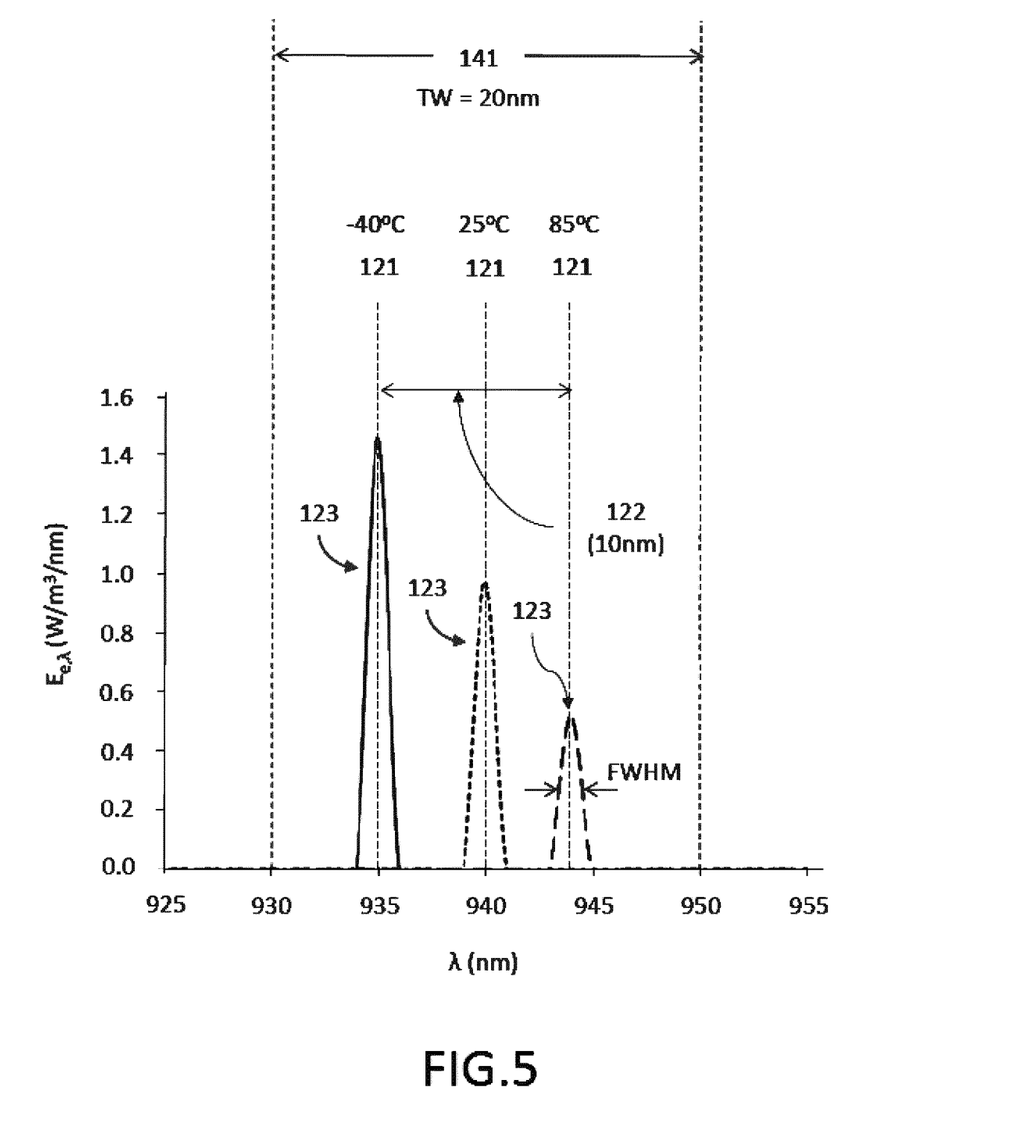
FIG. 5 shows three infrared spectra of one VCSEL at different temperatures.

FIG. 5 shows three infrared spectra 123 of the same VCSEL 12 at three different temperatures of −40° C., +25° C. and +85° C. The peak wavelength 121 is 940 nm at +25° C. here considered as room temperature. The emission spectra 123 of the VCSEL 12 have a full width of half maximum FWHM of less than 1 nm, here of 0.8 nm. As a comparison, infrared LEDs have spectra with full width of half maximum of 37 nm or more. The peak wavelength 121 of the VCSEL 12 has a wavelength shift 122 of less than ±9 nm, here of ±5 nm around the peak wavelength 121 at 25° C. (approximately room temperature) within the temperature range between −40° C. and +85° C. The narrow emission spectra and the low temperature shift allows to apply a transmission window 141 of the bandpass filter 14 with widths TW of 20 nm or less, e.g. of 15 nm. Within such narrow transmission windows TW the complete infrared light emitted by the VCSEL when being operated within the range of temperatures between −40° C. and +85° C. usually covering realistic operating temperatures transmit the bandpass filter. The VCSEL light sources additionally provide a high light intensity. Both result in a high infrared signal level. In combination with the position of the transmission window of the bandpass filter providing a low noise level due to the water deep, the signal-to-noise ration of the resulting image based on the measured infrared light is significantly increased.

Figure 6:
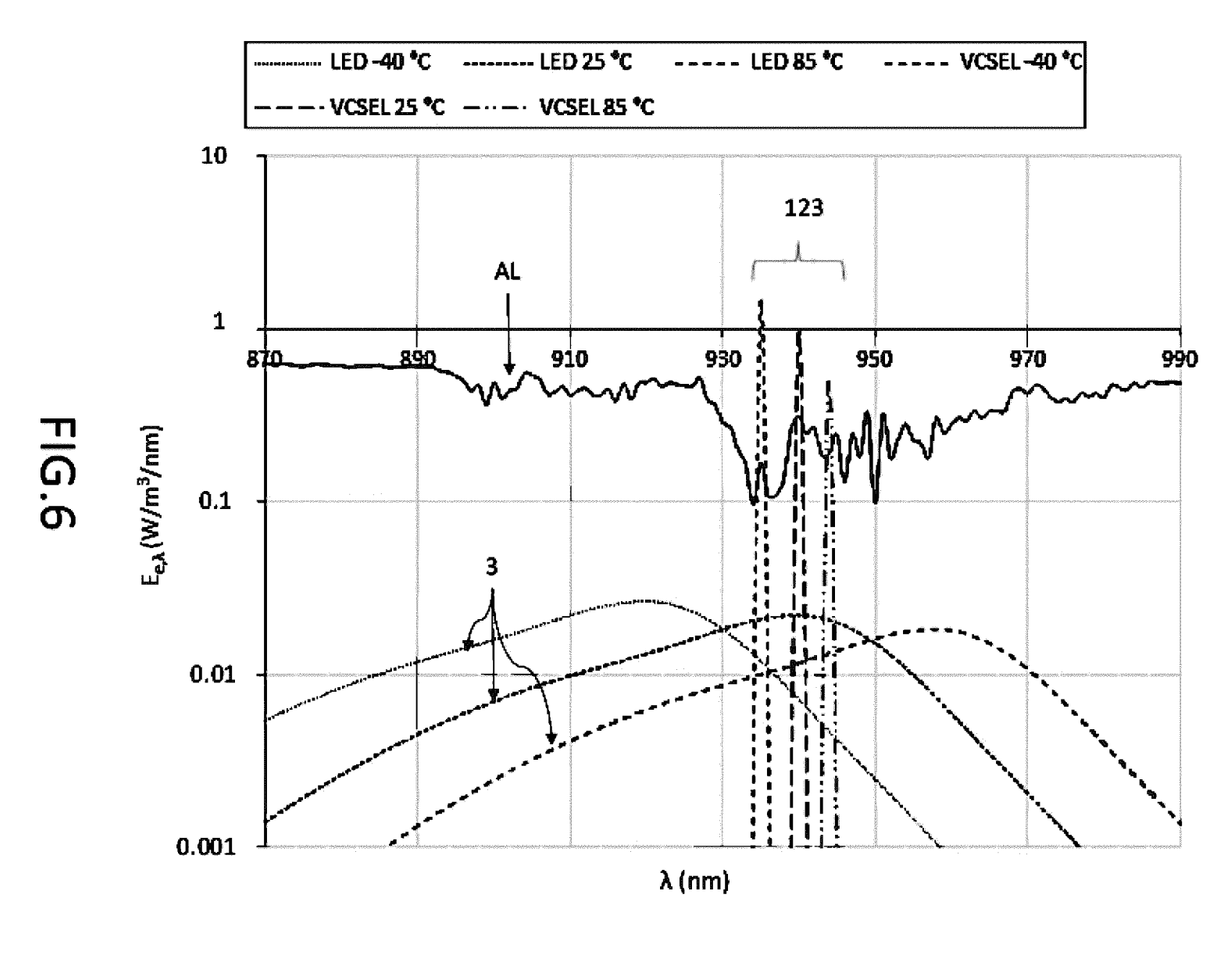
FIG. 6 shows the infrared spectra of solar light and VCSELs and LEDS at different temperatures.

FIG. 6 shows the irradiance of an object at 90 cm distance and 0° referenced to the normal vector to the surface of the emitter in $W/m^3/nm$ of the infrared spectra of solar light AL and emission spectra 123, 3, of VCSELs 12 and LEDS at temperatures of −40° C., +25° C. and +85° C. as a function of wavelengths. For more details to the emission spectra 123 of the VCSELs we refer to FIG. 5. The infrared emission spectra 123 provided by the VCSELs have intensities of two orders of magnitude larger compared to infrared LED spectra 3, which are broad spectra preventing the use of bandpass filters with narrow transition windows adapted to the water deep between 925 nm and 955 nm of the solar spectrum AL when demanding for a high intensity level provided by the infrared light source. Also the temperature shift of the peak wavelength is much higher for LEDs than for VCSELs providing the above described further advantage of VCSELs as infrared light sources.

Figure 7:
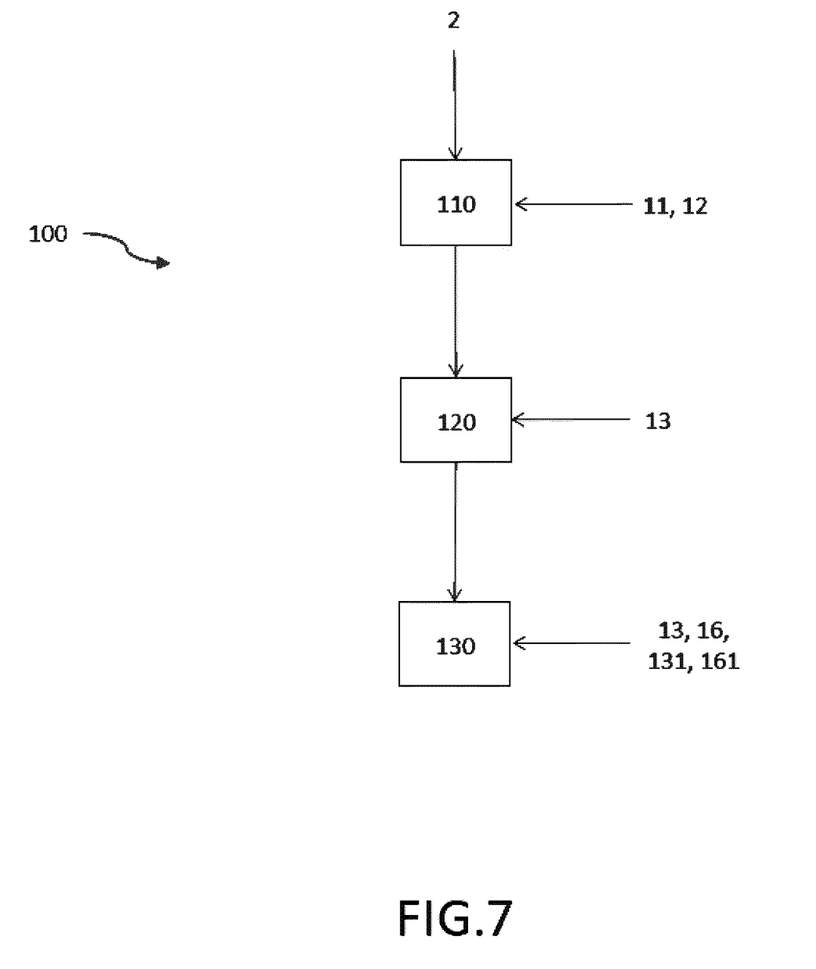
FIG. 7 shows a principle sketch of an embodiment of the method according to the present invention.

FIG. 7 shows a principle sketch of an embodiment of the method 100 for biometric identification of an object 2 with a device 1 according to the present invention an optical image sensor element 11 at least sensitive to an infrared spectrum, an infrared light source 12 to provide infrared light IR for additional infrared light conditions ILC, an infrared bandpass filter 14 being arranged in the light path LP between the object 2 and a sensor array of the optical image sensor element 11, and a processing unit. The method 100 comprises the steps of taking 110 at least one picture 112 of the object 2 under ambient light conditions ALC with additional infrared light conditions ILC, where the infrared light source 12 emits infrared light IR with a peak wavelength 121 between 925 nm to 955 nm and the infrared bandpass filter 14 has a transmission window 141 between 925 nm and 955 nm covering the peak wavelength 121 of the VCSEL 2; obtaining 120 an image or image code 131 for the biometric identification from the picture 112 by the processing unit 13; and executing 130 the biometric identification by comparing the obtained image 131 with reference images 161 from an image database 16 (see also FIG. 3). In an embodiment the taking step 110 comprises taking at least two separate pictures 111, 112 of the object 2 under ambient light conditions ALC with and without and infrared light conditions ILC, and the obtaining step 120 comprises subtracting the picture 111 under ambient light conditions ALC from the picture 112 under additional infrared light conditions ILC by the processing unit 13 to obtain the image or image code 131 for the biometric identification (see also FIG. 2).

The VCSEL 2 may have a peak wavelength 121 between 930 nm and 950 nm at room temperature, preferably approximately at 940 nm at room temperature. The infrared bandpass filter 14 might be adapted to pass less than 0.30% of the ambient light AL. Furthermore a diffuser unit 15 might be arranged within the light path LP between the VCSEL 12 and the object 2 providing a light beam 124 with a beam angle BA between 20° and 60° towards the object 2.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS

1 device for biometric identification
11 optical sensor element
111 taken picture under ambient light conditions
112 taken picture under infrared light conditions
12 infrared light source, e.g. a VCSEL
121 peak wavelength of the VCSEL
122 temperature caused wavelength shift of the peak wavelength
123 emission spectrum of the VCSEL
124 light beam illuminating the object
13 processing unit
131 image obtained from subtracting the pictures 111, 112 from each other
14 infrared bandpass filter (VCSEL)
141 transmission window of the bandpass filter
15 diffuser unit
16 image database
161 reference image
2 object to be identified with the device
3 LED spectrum
31 transmission window of infrared bandpass filter in case of using LEDs
100 Method for biometric identification
110 taking at least picture the object under ambient light conditions with additional infrared light conditions
120 obtaining an image or image code from the picture with additional infrared light conditions for biometric identification
130 executing the biometric identification
AL ambient light, solar spectrum
ALC ambient light conditions
BA beam angle of the light beam illuminating the object
FWHM full width of half maximum
ILC infrared light conditions
IR infrared light
LP light path (from light source via object to optical sensor element)
TW width of the transmission window

The invention claimed is:

1. A device for biometric identification of an object comprising an optical image sensor element at least sensitive to an infrared spectrum to take at least one picture of the object under ambient light conditions with additional infrared light conditions, an infrared light source to provide additional infrared light for the infrared light conditions, and a processing unit to provide an image or image code for the biometric identification obtained from the picture, where the infrared light source emits a narrow infrared light spectrum with a peak wavelength between 925 nm to 955 nm and with a full width of half maximum of less than 5 nm, and where an infrared bandpass filter is arranged in the light path between the object and a sensor array of the optical image sensor element having a transmission window between 925 nm and 955 nm covering at least the peak wavelength of the infrared light source.

2. The device as claimed in claim 1, wherein the peak wavelength of the infrared light source has a wavelength shift of less than ±9 nm around the peak wavelength at room temperature with a temperature range between −40° C. and +80° C.

3. The device as claimed in claim 1, wherein the peak wavelength of the infrared light source is between 930 nm and 950 nm at room temperature.

4. The device as claimed in claim 1, wherein an emission spectrum of the infrared light source has a full width of half maximum (FWHM) of less than 1 nm.

5. The device as claimed in claim 1, wherein the infrared light source is a vertical-cavity surface-emitting laser (VCSEL).

6. The device as claimed in claim 1, wherein the transmission window of the bandpass filter has a width of less than 30 nm.

7. The device as claimed in claim 6, where the infrared bandpass filter is adapted to pass less than 2% of the entire ambient light.

8. The device as claimed in claim 1, further comprising a diffuser unit arranged within the light path between the infrared light source and the object providing a light beam with a beam angle between 20° and 100° towards the object.

9. The device as claimed in claim 8, wherein the diffuser unit is arranged on top of the infrared light source.

10. The device as claimed in claim 1, wherein the device comprises or is at least connected to an image database storing reference images or reference image codes in order to perform the biometric identification by comparing the obtained image or image code with the reference images or reference image codes.

11. The device as claimed in claim 1, wherein the device is adapted to take at least two separate pictures of the object under the ambient light conditions with and without the infrared light conditions, where the processing unit provides the image or image code from subtracting the picture under the ambient light conditions from the picture under the ambient light conditions with the additional infrared light conditions.

12. The device as claimed in claim 1, wherein the device is a mobile phone, a tablet computer, a driver monitoring unit for automotive applications or an access checking component of a locking unit.

13. Method for biometric identification of an object with a device as claimed in claim 1 comprising an optical image sensor element at least sensitive to an infrared spectrum, an infrared light source to provide infrared light for additional infrared light conditions, an infrared bandpass filter being arranged in the light path between the object and a sensor array of the optical image sensor element, and a processing unit, comprising the steps of:

(a) taking at least one picture of the object under ambient light conditions with additional infrared light conditions, where the infrared light source emits infrared light with a peak wavelength between 925 nm to 955 nm, and the infrared bandpass filter has a transmission window between 925 nm and 955 nm covering the peak wavelength of the infrared light source, (b) obtaining an image or image code for the biometric identification from the picture by the processing unit, and (c) executing the biometric identification by comparing the obtained image or image code with reference images or reference image codes from an image database.

14. The method as claimed in claim 13, where the taking step comprises (a.1) taking at least two separate pictures of the object under ambient light conditions with and without and infrared light conditions, and where the obtaining step comprises (b.1) subtracting the picture under ambient light conditions from the picture under additional infrared light conditions by the processing unit to obtain the image or image code for the biometric identification.

15. The method as claimed in claim 13, wherein the infrared light source is a vertical-cavity surface-emitting laser (VCSEL) and a diffuser unit is arranged within the light path between the VCSEL and the object providing a light beam with a beam angle between 20° and 60° towards the object.

* * * * *